Patented Mar. 29, 1932

1,851,362

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC SIDE CHAIN OXIDATION OF AROMATIC COMPOUNDS

No Drawing. Original application filed August 26, 1927, Serial No. 215,759. Divided and this application filed March 31, 1928. Serial No. 266,463.

This invention relates to the catalytic oxidation of the side chains of side chain aromatic compounds, especially in the vapor phase.

According to the present invention side chain aromatic compounds are oxidized, preferably in the vapor phase, to corresponding aldehydes and acids by causing them to react with an oxidizer, for example an oxidizer gas such as air, in the presence of a new class of catalysts or contact masses, namely, catalysts or contact masses which contain multicomponent zeolites, diluted or undiluted. Some of these new catalysts have been described and claimed as products in my application, Serial No. 142,783, filed October 19, 1926 which matured into Patent No. 1,728,732 dated September 17, 1929, of which the present application is in part a continuation. The catalytic oxidation of organic compounds generally by means of catalysts or contact masses containing multi-component zeolites has been described and claimed broadly in my application, Serial No. 215,759, filed August 26, 1927 which matured into Patent No. 1,722,297 dated July 30, 1929, of which the present application is a division.

Zeolite forming components may be divided into three classes:—silicates with or without partial substitution of other suitable acidic oxides; metallates, such as alkali metal metallates; and salts of metals which are sufficiently amphoteric to form base exchange bodies when caused to react with silicates under conditions suitable for the production of zeolites. The ordinary zeolites of commerce are prepared by the reaction of a soluble silicate, either with alkali metal metallates or with metal salts. The catalysts of the present invention, on the other hand, are reaction products of a silicate with at least one metallate and at least one metal salt. The present invention is directed to processes of oxidizing side chain aromatic compounds in the presence of such multi-component zeolites and their derivatives, in which at least one catalytically active element or radical is chemically combined with or in the zeolite. Both diluted and undiluted multi-component zeolite catalysts can be used in the present invention, but in many cases the use of diluted multi-component zeolites is preferable. In the diluted zeolite contact masses used in the present invention, the catalytic power may reside wholly in the zeolite or in chemical combination therewith, or it may reside partly in the zeolite and partly in diluents combined therewith to form mixtures or preferably physically homogeneous structures. In some cases diluents may be associated with catalytically ineffective multi-component zeolites, and such processes are included within the scope of the present invention.

All of the base exchange bodies used in the present invention, both diluted and undiluted, possess a remarkably porous, honeycomb-like structure, and are in many cases opalescent. When suitable catalytically active components are present, they form catalysts or contact masses of remarkable efficiency, due probably in part at least to the extraordinarily high surface energy of the microscopically porous structures, and probably also to the presence of unsaturated valences in many cases and a symmetry of the molecules. It is of course possible that the catalytic activity of the contact masses used in the present invention is due partly or wholly also to other reasons, and the present invention is therefore not intended in any sense to be limited to any theory of action of the products. The molecular complexes which are present in the products used in the present invention are apparently of great size and complexity, and the exact chemical constitution has not been determined, nor has it been determined definitely whether in all cases single chemical compounds are formed, and it is possible that in some cases at least molecular mixtures or solid solutions may be present. The products used possess a physically microscopical homogeneity, and behave in many ways as if they were single compounds or in the case of diluted zeolites, the zeolite skeleton behaves as if it were a single compound, and I am of the opinion that probably in many cases at least the zeolites are actually in fact single compounds of high molecular weight.

It should be understood that the products used in the present invention are chemically quite distinct from zeolites formed by the reaction of a silicate with either metallates or with metal salts, the so-called two-component zeolites.

The products used in the present invention fall into three main types, depending on the relative proportions of the three classes of components:—If the silicate and metallate components predominate over the metal salt components the resulting products resemble the alumino-silicate type of zeolites; if the metal salt and silicate components predominate over the metallate component the resulting products have certain resemblances to the aluminum-double silicate type of zeolites; where the metallate and metal salt components predominate over the silicate components the products resemble the non-silicious base exchange bodies described in my prior Patent No. 1,694,620, dated December 11, 1928. It should be understood of course that there are no sharp lines dividing the different types, and one type shades over into the other, as the relative proportions of the components are varied. I have found that all three types of zeolites when prepared with suitable catalytically active components, or associated with suitable catalytically active diluents, and particularly when containing elements of the 5th and 6th groups of the periodic system especially vanadium, form very effective catalysts for the oxidation of many side chain aromatic compounds.

The fact that the zeolites used in the present invention are the reaction products of silicates with both metallates and metal salts makes it readily possible to introduce catalytically active components of the most varying types, and the introduction of catalytically active components of different types is readily facilitated, since some catalytically active elements or some valences of such elements form metal salts but do not form metallates, or vice versa. All such catalytically active components can of course be readily introduced into zeolites used in the present invention, and this constitutes an important advantage. Another important advantage of the invention lies in the fact that apparently owing to the great molecular weight of the zeolites used the proportions of the components entering into the zeolite can be varied practically at will, and exact combining proportions of the various elements are not encountered as in the case of simple chemical compounds of relatively lower molecular weight.

The zeolites of the present invention can be prepared under reaction conditions suitable for the formation of base exchange bodies; that is to say, in reaction mixtures which are finally alkaline to litmus. The best base exchanging power is obtained when the products are prepared in solutions which are neutral or preferably alkaline to phenolphthalein, but products of lower base exchanging powers which for the catalytic oxidations of side chain aromatic compounds are frequently of equal efficiency can be produced under reaction conditions ranging from phenolphthalein red to litmus blue as indicator turning points. It is not possible to determine whether zeolites formed under such conditions are homogeneous chemical compounds; it may be that in such cases a mixture of zeolites and non-base exchanging polysilicates are produced. The physical structure, however, remains similar and for catalytic purposes the products are equivalent to zeolites produced under conditions which result in greater base exchanging powers. It should be understood, however, that the word "zeolite" as used in the present application is limited to polysilicates which have at least some base exchanging power when freshly prepared.

Products used in the present invention may be prepared in many ways:—I have found that usually it is desirable to add the metal salt to the metallate and silicate so that at all times the alkali of the latter components is present in excess, and accordingly the reaction automatically at all times remains alkaline to litmus. While, however, this preferred method presents numerous advantages in most cases and results in the production of excellent products with a minimum of supervision, other methods of reaction can be used, and are included in the invention.

Certain of the catalysts used in the present invention may be prepared by adding the silicate or metallate components, or both, to the metal salt components, care being taken that after the reaction is completed the reaction mixture is alkaline to litmus, and preferably neutral or alkaline to phenolphthalein. It is probable that during the reaction at first ordinary silicates are formed, which are later transformed more or less completely into base exchanging bodies. The base exchanging power of such products is lower than that of products which are prepared by adding the metal salt components to the other two components. So that the reaction continuously remains alkaline, but many effective catalysts can be produced by the other method, and are therefore included in the scope of the present invention.

The number of elements which may be included in the products used in the present invention is very large. Thus for example, any of the metal elements which are capable of forming soluble alkali metal metallates may be used, and similarly complex compounds of metals, which metals possess a more or less amphoteric property may be used, and for some purposes are of great importance, as they permit the production of soluble metallate components, whereas the simple oxides of the metals may not be suitable, because they do not form soluble alkali metal metallates. A few among the complex ionogens may be mentioned:—ammonia, hydrocyanic acid, sulfocyanic acid, oxalic acid, formic acid, tartaric acid, citric acid, glycerine and various types of sugars.

Certain compounds such as for example, vanadates, molybdates, tungstates, tantalates and uranates, which are not ordinarily considered as metallates, but which are capable of forming base exchange bodies with soluble silicates and metal salts, are intended to be included under the term "metallates" as used in the present invention. I therefore include under this term any alkali metal compound of a metal acid which is capable of forming with soluble silicates and metal salts base exchange bodies, or which can be rendered capable of so reacting by a change of valance which can be effected during the reaction. Thus for example, certain alkali permanganates which are incapable of forming base exchange bodies containing heptavalent manganese may be caused to react with soluble silicates and metal salts in the presence of suitable reducing agents which reduce the permanganate to a stage of oxidation in which it is capable of behaving as a metallate. Such compounds are included under the classification of metallates for the purposes of the present invention, and some very valuable products can be produced by the use of this type of compound. An example of an important element which may be so used is tetravalent vanadium.

The present invention may utilize a single metallate component, or a plurality of metallate components in any desired ratio may be used. The following elements are included among those forming metallates which can be used:—aluminum, chromium, zinc, vanadium, beryllium, tin, palladium, osmium, platinum, titanium, zirconium, lead, tungsten, boron, molybdenum, uranium and tantalum, copper, nickel, iron, cobalt, silver, cadmium, manganese, bismuth, thorium, and cerium.

The metal salt components are likewise numerous, and in general, any water-soluble, acid, neutral or basic salts or any mixtures may be used. The following elements are included among those which form suitable salts:—copper, silver, gold, beryllium, zinc, cadmium, aluminum, rare earths, titanium, zirconium, tin, lead, thorium, chromium, uranium, vanadium, manganese, iron, nickel and cobalt.

The silicate component may be an alkali metal silicate or other silicate which is soluble in alkali or part of the silicate component may be substituted in part by alkaline salts of the acids of the following elements:—boron, phosphorus, sulfur, nitrogen, tin, tellurium, selenium, arsenic and antimony. All of these compounds are capable of forming base exchange bodies with the other components, and are therefore to be considered the equivalent of the silicates.

The range of the new products used in the present invention is not limited to the elements present in the components which particularly form the non-exchangeable nucleus of the zeolite. On the contrary, it is possible to substitute the alkali metal ions by other metal cations by means of base exchange. Thus for example, one or more of the following cations may be introduced:—ammonium, copper, silver, gold, beryllium, magnesium, calcium, zinc, strontium, cadmium, barium, aluminum, thallium, titanium, zirconium, tin, thorium, vanadium, chromium, uranium, manganese, iron, cobalt, nickel, palladium, and platinum. The elements or radicals may be introduced as simple or complex ions, or both, in any desired proportions. The introduction can be effected simultaneously or successively. The number of possible combinations by means of base exchange is of course very great, as will be readily apparent to a zeolite chemist. The number of new compounds is therefore greatly increased, and many valuable products, particularly catalysts or activators, can be produced by the introduction of suitable base exchange ions, which may increase the concentration of catalysts or activators in the product, or may result in a more finely tuned catalyst. The increase in catalytic activity which is frequently possible by a suitable introduction of the desired cations by base exchange frequently increases the permissible loading of the product in side chain organic oxidations and may increase resistance to high temperatures, the percentage yield which can be obtained thereby, or the output, or both.

A further series of catalysts can be obtained by treating the base exchange bodies of the present invention with compounds containing suitable acid radicals which form with the base exchange bodies salt-like bodies. While these products behave in many ways as if they were actual salts, the exact chemical constitution of the products is not definitely known, and the invention is not intended to be limited by any theory as to compositions.

For the purposes of the present invention, acids or salts of the following elements may be used in order to produce salt-like bodies:—vanadium, tungsten, uranium, chromium, molybdenum, manganese, selenium, tellurium, arsenic, phosphorus, sulfur, chlorine, bromine fluorene nitrogen and boron. Simple acids or their salts can be utilized, or polyacids, peracids and complex ions may be substituted wherever this is desirable. Other complex anions, such as ferro or ferricyanogen, sulfocyanogen, other metal cyanogens, ammonia complexes and the like are useful wherever they form salt-like bodies with the base exchange bodies with which they are to react. One or more acid radicals may be introduced in the above described manner, either simultaneously or successively, and the amount of acid radicals introduced can be quantitatively varied so that by this means salt-like base exchange bodies having the characteristics of acid neutral or basic acid derivatives can be produced.

The diluted zeolites which I have found to be the most effective catalysts or contact masses for the oxidation of side chain aromatic compounds can be prepared in a number of ways by the incorporation of a large variety of diluents, such as for example, highly porous diluents, as kieselguhr, glaucosil, "Gelite" brick refuse, silicates, inactive zeolites, pumice meal, and other products, or they may be coated onto natural and artificial massive carrier fragments. The method of incorporating, and nature of diluents which are to be used, has been described in detail in the prior patent of Alphons O. Jaeger and Johann A. Bertsch, No. 1,701,075 dated February 5, 1929, where the incorporation of diluents in two component zeolites is described. While the present products are chemically quite different from zeolites which are prepared from two components, the methods of precipitation are analogous. I have found, therefore, that in most cases the same methods of incorporating diluents which have been described in the prior application, above referred to, in connection with two component zeolites, may be advantageously used for the incorporation of diluents in base exchange bodies used in the present invention. As described in the prior application, the diluents may be incorporated into the physical structure of the base exchange bodies, or the base exchange bodies can be formed in the interstices of relatively coarser diluents. Specific methods of incorporating diluents with base exchange bodies of the present invention will also be described in many of the specific examples which are to follow, it being understood of course that the invention is in no sense limited to the details of the examples which are illustrative modifications only.

The precipitation of the base exchange bodies is frequently slow, and sometimes incomplete, and it is often desirable to accelerate or complete the precipitation by heating, vigorous stirring, or by the addition of acids, either organic or inorganic, in liquid or gaseous form. Thus for example, hydrochloric acid, sulfuric acid, carbonic acid, nitric acid, acetic acid, formic acid and the like, or their acid salts, may be used. Ammonium salts and salts of the alkalis as well as halogens, alcohols and other organic substances, are frequently advantageous in accelerating precipitation, and are included in the scope of the present invention. In some cases, it is advantageous to operate under pressure in autoclaves, and the present invention is therefore not limited in its broader aspects to operations under any particular pressure.

The important property of porosity of base exchange products of the present invention may in many cases be enhanced by the incorporation with the bodies, during formation, of products which are readily removable either by volatilization, combustion or by leaching, leaving behind additional pores, and thus still further contributing to the premeability of the framework of the base exchange products. The removable products to be used may be inorganic or organic, and include a wide number of products, but the choice of products will of course depend on the characteristics of the base exchange body.

The production of base exchange bodies usually results in a considerable percentage of soluble salts in the reaction mixture, and it is generally desirable to wash out these salts and to dry the products preferably at moderate temperatures which may advantageously be below 100° C. Some of the products may contain too little alkali for the purposes for which they are to be used, or they may lack mechanical strength. These products may advantageously be washed or impregnated with a dilute water-glass solution, instead of with water, with a resulting silicification which considerably increases the mechanical strength of the product, and may also desirably affect its chemical constitution, particularly by changing its alkalinity or acidity.

I find that it is often advantageous to subject the catalysts and contact masses used in the present invention to a preliminary treatment, consisting, first, in a calcination in the presence of air or other gases as described in my prior Patents Nos. 1,678,626 and 1,678,627 dated July 24, 1928.

This preliminary treatment or the catalytic process itself, which takes place at high temperature, results in certain chemical changes in the catalyst or contact mass which are not well defined, and when the catalyst is referred to in the claim, it should be considered as of the time when it is freshly made, as is usual in catalytic chemical nomenclature.

The oxidation of many side chain aromatic compounds, requires a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some cases. Other catalytically active or activating substances which enhance the effectiveness of the stabilizers, and which are termed stabilizer promoters, may also be used. In fact whenever base exchange catalysts of the present invention which contain exchangeable alkali metal cations are given preliminary treatment with acid vapors, alkali forming metal compounds are produced which act as stabilizers, and many of the amphoteric or other metal components which are not selective catalysts for the particular side chain oxidation reaction may be considered, and act as stabilizer promoters. I do not claim in this application the use of stabilizers or stabilizer promoters in general, as these form the subject-matter of my co-pending application, Serial No. 265,521, filed March 28, 1928. The expressions "stabilizers" and "stabilizer promoters", when used in the present application, are to be understood as used in the sense in which they are defined in the aforementioned co-pending application. It should be understood that while many of the multi-component zeolite catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds are to be considered as stabilizer promoters.

The invention will be described in greater detail in connection with the following specific examples which are illustrative merely, and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular reaction in which he is interested.

Example 1

Three mixtures are prepared as follows:

(1) 210 to 250 parts of potassium or sodium waterglass solution of 33° Bé. diluted with 15 to 20 volumes of water are mixed with kieselguhr or other material rich in $SiO_2$ such as glaucosil, the acid treated residue of greensand, until a suspension is obtained which is just stirrable.

(2) 18 parts of $V_2O_5$ are dissolved in just sufficient 10–20% caustic potash or caustic soda solution so that potassium or sodium vanadate is obtained.

(3) 18 parts of $V_2O_5$ are reduced with sulphur dioxide in aqueous suspension in the usual way to form the blue vanadyl sulfate about 200 to 300 parts of water being needed. The excess $SO_2$ is removed by boiling.

Mixtures (1) and (2) are poured together and solution (3) is permitted to flow in with vigorous agitation, taking care that the reaction mixture remains at least alkaline to litmus. The alkalinity can be adjusted by slight additions of N. potassium hydroxide solution, if necessary. A dirty gray-blue gel results which is filtered with suction, washed with a little water and then dried and constitutes a three component base exchange body containing tetravalent and pentavalent vanadium in non-exchangeable form and having materials rich in $SiO_2$ finely distributed throughout its framework.

After calcination the contact mass is well suited for the catalytic oxidation of crude anthracene directly to high grade anthraquinone when 45 to 50 per cent anthracene is uniformly vaporized with air in the ratio of 1:25 and passed over the catalyst at 380 to 450° C.

Contact masses which contain aluminum, titanium and cerium or one of these elements in addition to silver and copper are well suited for the catalytic oxidation of toluol and the various halogen and nitro substituted toluols to the corresponding aldehydes and acids; xylene, pseudocumene, mesitylene, paracymene, or other derivatives to the corresponding aldehydes and acids.

A further improvement of these contact masses for several specific catalytic oxidation reactions can be effected by forming salt-like bodies of the three component base exchange body with acids of the elements of the 5th and 6th group of the periodic system, especially vanadium, tungsten, and molybdenum.

A further modified method of preparing highly efficient contact masses consists in introducing in the diluents, before use, vanadates, molybdates, tungstates, chromates or tantalates, especially of the heavy metals. For this purpose the diluents may be impregnated with 3 to 5% of such metallates in the usual way whereby very effective catalysts for the catalytic oxidations of many of the aforesaid hydrocarbons are obtained.

Example 2

Diluted and undiluted three component base exchange bodies and their salt-like bodies, as described in the foregoing examples, can be coated on to massive carrier fragments of natural and artificial origin such as, for example, materials rich in silica, e. g. quartz fragments, quartz filter stones, sand stones, fragments of silica gel, diatomaceous stones, "Celite" bricks, pumice fragments, fragments of natural or artificial silicates with or without base exchanging properties, especially zeolites diluted with materials rich in silica, unglazed porcelain fragments, metals such as aluminum granules, metal alloys such as ferro-silicon, ferro-vanadium, ferrochrome, and the like, particularly when their surface has been roughened.

The coating of these carrier materials can take place either after formation of the product or the formation can be caused to take place on the carrier fragments, the alkaline reacting components, e. g., the waterglass and metallate solutions being first coated onto carrier fragments and then the metal salt component solution sprayed on them, whereby the three component zeolite, which is a good adhesive, is fixed on the carrier fragments. The coating process can also be carried out in the reverse order.

Very suitable types of artificial carrier fragments can also be prepared, for example, by forming fragments of "Celite", kieselguhr, pulverized quartz, pumice stones, silica gel, pulverized silicates and diluted or undiluted pulverized zeolites, using various adhesives such as waterglass, alkalis, or alkali metal salts followed by calcination preferably at 400 to 500° C. and if desired a treatment with inorganic acid such as sulphuric acid, nitric acid, phosphoric acid, hydrochloric acid and the like.

For the preparation of contact masses especially for the selective purification of crude anthracene by selective total combustion especially of carbazole, $CaO$, $Ca(OH)_2$, $CaO$—$NaOH$, or $CaO$—$KOH$ can be used which are excellent adhesives and at the same time act as activators in this process.

Other initial materials for the preparation of artificial carrier fragments can be used, such as, alkali, waterglass, mixtures of alkalis with alkaline earths, greensand pretreated in various ways and then hydrated with water in order to improve its physical properties, especially its absorptive power which is very helpful in the catalytic oxidation of organic compounds.

A further voluminous carrier mass is produced by treating finely ground silica, such as, diatomaceous earth with lime in the presence of water with or without heat. Other oxides or hydroxides, such as, strontium may be used instead of lime. The product is then dried and pulverized or the wet mass may be calcined and carbonated during or after calcination. By this process a considerable amount of hydrated calcium metasilicate is produced which is a very useful diluent for the preparation of such catalytically active diluted zeolites and also for the preparation of artificial carrier fragments usable in these processes.

The ratio of coating is about 1 kilo by weight of diluted or undiluted base exchange bodies to 10 liters of pulverized carrier fragments.

Instead of introducing diluent bodies into the three component base exchange bodies during formation as described in foregoing examples, the undiluted base exchange bodies, after preparation, while still in the wet form, can be mixed mechanically in aqueous suspension with the diluent bodies, or, the base exchange bodies may be dried and pulverized and then mixed with the latter. In most cases 50 to 100 parts of diluents are sufficient and the mixture can be formed into granules with any of the above described adhesives, especially alkali or waterglass.

The products thus produced are effective contact masses for the catalytic oxidation of many of the organic substances, as described in the foregoing example under the reaction conditions there given.

*Example 3*

12 parts of $V_2O_5$ are suspended in 300 parts of water to form a slurry, acidified with 3 to 6 parts of concentrated sulphuric acid and then reduced to the blue vanadyl sulphate by well known reducing means as, for example, by means of gases containing $SO_2$ which are passed in the solution at the boiling temperature.

108 parts of waterglass solution of 33° Bé. are diluted with 400 parts of water and about 80 to 100 parts of "Celite" brick refuse are stirred in.

The waterglass solution is then poured into the vanadyl sulphate solution with vigorous agitation precipitating out vanadyl silicate diluted with "Celite" brick refuse. Care should be taken that after all the solutions have reacted the resulting mixture must be neutral to litmus, which can be adjusted with the help of small amounts of N. sulphuric acid.

150 parts of potassium waterglass solution of 33° Bé. are diluted with 300 parts of water.

6 parts of $V_2O_5$ are transformed with the help of N.KOH solution to potassium metavanadate and the waterglass solution and vanadate solution are mixed together.

40 parts of $Al_2(SO_4)_3 18$ aq. are dissolved in 250 parts of water.

To this latter solution the ground, diluted vanadyl silicate is added with vigorous agitation in order to bring it in a suspension, then the mixture of the two solutions of waterglass and vanadate are added in a thin stream with vigorous agitation.

The reaction mixture after the addition of the mixed solutions must be neutral or alkaline to phenolphthalein and the desired neutrality or alkalinity can easily be adjusted by using corresponding amounts of N. sulphuric acid with vigorous agitation. The reaction mixture is separated from the mother liquor in the usual way and washed with twice the amount of the mother liquor obtained, dried and broken in suitable pieces.

After calcining, for dehydrating purposes, the contact mass obtained can be used for the catalytic oxidation of 50 to 70% crude anthracene direct to anthraquinone; thereby the impurities such as carbazole and phenanthrene are substantially burned out.

Instead of using a potassium vanadate solution as the metallate component other catalytically active metallates, such as, tungstates and molybdates, may be used.

Instead of using an aluminum sulphate solution as the metal salt component other metal salts, such as those of iron, copper, silver, nickel, cadmium, titanium, zirconium and chromium may be used singly or in admixture, contact masses with specific efficiency for other oxidation reactions being produced.

In the cases in which tungstates or molybdates, or a mixture of them, are used instead of the vanadate, specifically effective contact masses are obtained. With such contact masses cresol can be oxidized to salicylaldehyde and salicylic acid, when the compound, mixed with air in various ratios from 1:15 to 1:20, are passed over the contact mass at 360 to 400° C.

*Example 4*

(1) 6.6 parts of $Al_2O_3$, freshly precipitated, are dissolved in N.KOH solution in order to form the corresponding potassium aluminate. To this solution are added diluents rich in $SiO_2$ such as comminuted silicates, quartz. ground rocks, tuffs, lava of volcanic or eruptive origin, artificial and natural zeolites, kieselguhr, "Celite" brick refuse. In using "Celite" brick refuse or kieselguhr 80 to 100 parts are the proper amount in order to prepare the diluted three component zeolite.

Diluents of advantageous character can also be prepared by special means. Thus for example, diluents containing $SiO_2$ may consist of colloidal $SiO_2$ or the product from the treatment of natural or artificial base exchanging silicates with dilute mineral acids, which treatment removes both the exchangeable alkali metals and the amphoteric metal oxide and leaves an $SiO_2$ complex of highly absorptive physical structure. The siliceous diluents thus prepared when mixed with "Celite" brick refuse of kieselguhr are of great value in the preparation of three-component zeolite contact masses to be used in the catalytic oxidation of organic compounds.

In some cases it is also advantageous to add 5 to 10% of specially prepared silicates which act in this process as stabilizer promoters. Such silicates are an intermediate step in the preparation of the complex $SiO_2$ from artificial and natural base exchanging silicates. Base exchanging silicates such as leucite or artificial zeolites as commonly prepared are leached out with diluted mineral acids such as 5 to 10% sulphuric acid, hydrochloric acid or nitric acid, in order to remove the alkali from the exchangeable part of the base exchange body, leaving the amphoteric metal oxide in chemical combination with the $SiO_2$ group. Such silicates have a very high absorptive power and are excellent means for tuning the stabilizer action of the stabilizers in complex combination with the catalytically active portions of the contact masses.

(2) 80 parts of potassium waterglass solution with an approximate strength of 33° Bé. are dissolved in 100 parts of water.

(3) 24 parts of $Al_2(SO_4)_3$ plus 18 aq. are dissolved in 150 parts of water.

The aluminate suspension (1) is quickly mixed with the waterglass solution with strong agitation and the aluminum sulphate solution is added in a thin stream whereby a diluted gelatinous three component base exchange body is obtained which contains $Al_2O_3$ and $SiO_2$ in the non-exchangeable part. The mother liquor of the base exchange body is removed in the usual way, the presscake obtained dried preferably below 100° C., and then the dried body is broken in suitable pieces. In order to increase the yield small amounts of very dilute $H_2SO_4$ (5%) may be used whereby care must be taken that the reaction product and the mother liquor remain substantially neutral or weakly alkaline to phenolphthalein.

In this base exchange body the silicate and metallate components predominate over the metal salts component so that the resulting product resembles an alumino-silicate type of zeolite.

Using the same amount of components, another type of three component zeolite can be obtained when the order, in which the three classes of components are reacting together, is changed. In this case the alkaline reacting components, the aluminate and waterglass solution are poured in the aluminum sulphate solution in which case the diluents may be present in the mixture of the alkaline components or in the metal salt component. The gelatinous mass obtained is worked up in the same way as before and dried.

The metal salt component and metallate component may first act together, the diluent body being preferably in one of these two components, and then the $SiO_2$ component is added.

These methods show the many possible modifications for the preparation of certain types of three component base exchange bodies.

Instead of changing the order in which the three classes of components react together, the amount of the components may be changed whereby other types of three component zeolites are obtained.

This is the case when the following percentage amounts of the components are used:

(1) 3.4 parts of $Al_2O_3$, freshly precipitated, are dissolved in N.KOH solution in order to form the potassium aluminate solution as the metallate component.

(2) 120 to 150 parts of potassium waterglass of 33° Bé. are dissolved in about 200 parts of water.

(3) 44.5 parts of $Al_2(SO_4)_3$ plus 18 aq. are dissolved in about 200 parts of water.

The diluent is added to one or the other or to the mixture of the alkaline reacting components.

A special method for the preparation of these three component zeolites consists of mixing the aluminate and $SiO_2$ component together and then adding the aluminum sulphate component. This procedure can also be carried out in the reverse order.

The reaction product obtained is worked up in the usual way and in this case the metal salt and silicate components predominate over the metallate component resulting in a three component zeolite which has certain resemblances to an aluminum double silicate type of zeolite.

The preparation of three component base exchange bodies in which the metallate and metal salt components predominate over the silicate component and producing a product which resembles a non-silicious base exchange body, is carried out as follows:

(1) 5 parts of $Al_2O_3$, freshly precipitated, are dissolved in N.KOH solution in order to form the corresponding potassium aluminate.

(2) 34 parts of $Al_2(SO_4)_3$ plus 18 aq. are dissolved in 200 parts of water.

(3) 50 parts of potassium waterglass solution of 33° Bé. are dissolved in 100 to 150 parts of water.

The above described diluents in the proper amount may be added to one of the components or to the mixture of the alkaline reacting components.

A base exchanging body of this type with well developed base exchanging power is obtained when the aluminate and silicate components are mixed together and then the aluminum sulphate component is added with strong agitation. The reaction product obtained is freed from the mother liquor and dried in the usual way. Another further modification can be obtained when the components react in the reverse order.

Instead of using for the metallate component $Al_2O_3$ other components of this class may be used which contain vanadium, tungsten, molybdenum, lead, zinc or cadmium, with or without aluminum, singly or in admixture.

Instead of using aluminum sulphate other metal salts, with or without aluminum sulphate may be used singly or in admixture. Such salts may for example, contain vanadium, especially vanadyl sulphate, zinc, cadmium, titanium, zirconium, copper, nickel, cobalt, silver, beryllium, cerium, tin, thorium, manganese, chromium or iron.

By these methods base exchange bodies can be obtained which may or may not be catalytically active for the catalytic oxidation of organic processes depending on the components selected.

When the vanadium or other elements of the 5th and 6th group of the periodic system, or their mixtures, are used, the base exchange body, itself is catalytically active. When components are used which, in the combination in the base exchange body, are not catalytically active, the catalytically active component may be introduced by base exchange or by the formation of salt-like bodies, or by both, the catalytic power residing in both cases in chemical combination with or in the three component zeolite.

The catalytic power may also reside wholly in the three component zeolite or in chemical combination therewith or it may reside partly in the zeolite and partly in diluents combined therewith to form mixtures preferably of physical homogeneous structures. Catalytically active diluents may also be associated with catalytically ineffective multicomponent zeolites.

A diluted three component zeolite which contains aluminum and $SiO_2$ in the non-exchangeable part has no catalytic power for many catalytic oxidations of organic compounds to intermediate oxidation products, and, this body can be transformed in an efficient contact mass in several ways. The alkali metal in the exchangeable part of the base exchange body may be replaced partly or in the largest possible extent by other metals, especially the heavy metals, such as, iron, copper, nickel, cobalt, manganese, silver, also titanium, zirconium, aluminum, by trickling 5 to 10% solutions of the corresponding salts or their mixtures over it at ordinary temperatures or somewhat elevated temperatures in order to accelerate the base exchange. Before carrying out the base exchange it is advantageous in many cases to hydrate the base exchange body by trickling water over it. After this treatment the base exchange bodies are brought into reaction with ammonium vanadate or other soluble vanadates in order to form the vanadate of the base exchange body. The best method is to impregnate the base exchange body with the vanadate solution the alkali being washed out after reaction. The base exchange body changes its color to that of the corresponding vanadates. For this purpose a 1 to 10% solution of the vanadate may be used.

After drying, the contact mass so obtained may first be calcined at 400 to 500° C. with air, then with diluted burner gases containing about 3% $SO_2$. Toluol and the various halogen and nitro substituted toluols are transformed to the corresponding aldehydes and acids; and xylenes, pseudocumene, mesitylene, paracymene and other derivatives to the corresponding aldehydes and acids, when these compounds, mixed with air in various ratios, such as, 1:40, are passed over the contact mass at 340 to 420° C.

In many cases it is also advantageous to introduce the catalytically active component or components into the exchangeable part of the three component zeolite, particularly by using about a 3 to 5% vanadyl sulphate in order to replace a maximum alkali metal by the vanadyl radical. After this procedure a salt-like body may be formed using therefor vanadates, tungstates, molybdates, or their mixtures in 3 to 5% solutions. This results in increasing the concentration of the catalytically active components which are in chemical combination with the three component zeolite. Such contact masses are also well suited for the catalytic oxidation of side chain aromatic hydrocarbons to valuable intermediate oxidation products.

A very efficient contact mass for such purposes may also be prepared by introducing catalytically active diluents such as, 5 to 10% of the metallates of the 5th and 6th group of the periodic system, especially silver vanadate, copper vanadate, manganese vanadate, iron vanadate, the corresponding tungstates, molybdates, uranates, tantalates, and their mixtures, in which case specific catalytic power may reside, partly or entirely, in the diluents.

A further improvement in these contact masses can be obtained when, in addition to the diluents described above, so-called stabilizer promoters are added, which particularly tune the stabilizer action of the alkali in the exchangeable part of the three component zeolite. In many cases 2 to 5% of such stabilizer promoters are sufficient. $Fe_2O_3$, $TiO_2$ or silicates especially of the heavy metals possess excellent stabilizer promoter properties for many catalytic side chains oxidations of organic compounds in which they themselves are not highly effective catalysts.

The modifications described in this example show that many highly effective catalysts for the catalytic oxidation of organic compounds can be prepared according to the present invention, all the specific features in the properties of such contact masses which are necessary for successful operation being fully taken into account.

Example 5

Highly effective base exchange bodies for the catalytic oxidation of organic compounds may be obtained by the combination of diluted or undiluted three component zeolites with other diluted and undiluted base exchange bodies which may or may not contain $SiO_2$ in the nonexchangeable part.

Many different methods for the preparation of such contact mass combinations may be used. Thus the three component zeolites may be embedded in other base exchange bodies singly or in admixture with other base exchange bodies or vice versa.

The following description of such contact masses will illustrate the many possible contact mass combinations of high efficiency for the catalytic oxidation of organic compounds, especially aromatic compounds.

16 parts of vanadic acid are formed into a slurry with 300 parts of water and then acidified with sulphuric acid. The mixture is then heated to boiling and a vigorous stream of sulphur dioxide is passed through the hot solution. In a short time a blue solution of vanadyl sulphate is obtained. After boiling out the excess sulphur dioxide the blue solution can be divided into two portions in the ratio of 2:3.

(1) $3/5$ of the blue solution are cautiously treated with a concentrated caustic potash solution until a clear brown potassium vanadite solution is obtained.

(2) 140 parts of potassium waterglass solution of about 36° Bé. are diluted with 500 parts of water.

(3) The remaining $2/5$ of the vanadyl sulphate solution constitutes the metal salt component for the preparation of the zeolite. The waterglass and potassium vanadite solutions are poured together and the vanadyl sulphate solution is added in a thin stream with vigorous agitation, whereupon the mass first solidifies to a gray green gel and by further stirring is transformed into readily filterable granular aggregates. Naturally care must be taken that the resulting mixture at least remains weakly alkaline or neutral to phenolphthalein, which can be adjusted by adding dilute $H_2SO_4$ about 5% until the proper alkalinity or neutrality is obtained, thus yielding the three component base exchange body. The yield can also be bettered by the addition of saturated alkali salts such as potassium sulphate or potassium bisulphate, whereby the latter also takes care of the excess of alkali in the preparation of such bodies.

The reaction mixture is allowed to stand, decanted, pressed and washed with water. The presscake is dried and the three component base exchange body containing $SiO_2$ and $V_2O_4$ is then ground, or preferably before grinding, the base exchange body may be hydrated by trickling water over it and again dried.

Instead of this base exchange body the corresponding diluted base exchange body may be prepared, preferably using materials rich in $SiO_2$ such as kieselguhr as diluents. The base exchange body may be embedded in a two component zeolite or in a base exchange body which does not contain $SiO_2$ as one of the original initial components.

90 parts of 33° Bé. potassium waterglass solution are diluted with 4 to 5 volumes of water and the three component zeolite obtained is together with sufficient unground infusorial earth added with vigorous stirring in order to obtain a uniform distribution of the diluents. When the diluted three component base exchange body is used in the preparation of this contact mass it is not necessary to add the infusorial earth to the waterglass solution as a further diluent.

60 parts of aluminum sulphate containing 18 mols of water are dissolved in 200 parts of water and sufficient 20% ammonia water is added in order to precipitate aluminum hydroxide. The aluminum hydroxide is then freed from the mother liquor, washed out and treated with sufficient 2 N. potassium hydroxide solution in order to prepare the corresponding aluminate solution. The aluminate solution is then stirred into the suspension of waterglass and the three component zeolite and the mixture is heated up to about 60° C. A gelatinous precipitate is obtained and is increased by the gradual addition of 2 N. sulphuric acid. In adding the sulphuric acid, care should be taken, however, that at least a weak alkalinity to phenolphthalein is maintained. The stirring is continued for about an hour, the mixture being gradually permitted to cool down to room temperature. The gelatinous precipitate obtained is pressed and washed with 200 parts of water in small portions and the filter cake is then dried and broken into fragments of suitable size.

In the preparation of this contact mass the two component zeolite may also contain catalytically active components.

Instead of using this two component zeolite a three component zeolite with or without specific catalytic efficiency for the catalytic oxidation of organic compounds may be used, especially as described in the foregoing examples. The process for the preparation of such contact masses may be carried out in the reverse order. The three component base exchange body may also be embedded in a base exchange body which is prepared in the following way:

12.2 parts of freshly precipitated aluminum oxide are brought into solution with 40 parts of 100% KOH in 200 parts of water. The three component base exchange body described above is then stirred into the solution and a 10% aqueous solution contain 37 parts of ferric sulphate with 18 mols of water or 44.4 parts of aluminum sulphate with 18 mols of water, or a mixture of the two, is added to the aluminate solution with vigorous agitation. The corresponding amount of titanium sulphate, zirconium sulphate and thorium nitrate may also be used.

The reaction product obtained, which is a non-silicious aluminum base exchange body and which does not possess catalytic properties for the catalytic oxidation of many organic compounds, is diluted with the catalytically active three component base exchange body and the combination of the two constitutes a highly active contact mass for the catalytic oxidation of organic compounds.

In the preparation of this base exchange body in which the diluted three component zeolites is embedded is components which possess catalytically active properties may also be used.

The process may also be carried out in the reverse order, that is to say, the non-silicious base exchange body may be embedded in the three component zeolite.

All contact masses obtained may be treated with 5% solutions of the salts of the heavy metals, as copper sulphate, iron sulphate, etc., in order to replace partly or to the largest possible extent the alkali of the base exchanging part of the zeolite molecules. In some cases it may also be desirable to produce so-called salt-like bodies as described in preceding examples. The introduction of heavy metals in the base exchange part of the zeolite combinations and the formation of so-called salt-like bodies results very often in contact masses which are highly resistant to high temperatures very often obtained in the catalytic oxidation of organic compounds.

These contact masses are applicable to many of the catalytic side chain oxidations described in the foregoing examples, under reaction conditions similar to those described in the foregoing examples.

In most of the examples the metal salt solution is added to the metallate solution, and this may be considered as the preferred method for producing non-silicious base exchange bodies used as contact masses in the present invention, but it should be understood that the invention is not limited to the use of contact masses or catalysts produced by this preferred procedure. On the contrary, some valuable contact masses may be produced by the converse procedure, in which the metallate solution is added to the metal salt solution. As in this case the relatively alkaline solution is added to the relatively acid solution it is impossible to maintain continuously an alkaline reaction. Care must of course be taken that in all cases after the reaction is completed the mixture shows alkalinity to litmus, and preferably a neutrality or alkalinity to phenolphthalein.

What is claimed as new is:

1. A method of oxidizing the side chains of side chain aromatic compounds, which comprises causing the compounds to react with an oxidizing gas in the presence of a contact mass containing a zeolite which is the reaction product of at least one soluble silicate, at least one metallate, and at least one salt, the basic radical of which is a metal capable of entering into the non-exchangeable nucleus of a zeolite.

2. A method of oxidizing the side chains of side chain aromatic compounds, which comprises causing the vapors of compounds admixed with an oxidizing gas to react in the presence of a contact mass containing a zeolite which is the reaction product of at least one soluble silicate, at least one metallate, and at least one salt, the basic radical of which is a metal capable of entering into the non-exchangeable nucleus of a zeolite.

3. A method of oxidizing the side chains of side chain aromatic compounds, which comprises causing the vapors of the compounds admixed with an oxidizing gas to react in the presence of a contact mass containing a diluted zeolite which is the reaction product of at least one soluble silicate, at least one metallate, and at least one salt, the basic radical of which is a metal capable of entering into the non-exchangeable nucleus of a zeolite.

4. A method of oxidizing the side chains of side chain aromatic compounds, which comprises causing the vapors of the compounds admixed with an oxidizing gas to react in the presence of a contact mass containing a zeolite which is the reaction product of at least one soluble silicate, at least one metallate, and at least one salt, the basic radical of which is a metal capable of entering into the non-exchangeable nucleus of a zeolite, at least one catalytically active component of the contact mass being chemically combined in or with the multi-component zeolite.

5. A method of oxidizing the side chains of side chain aromatic compounds, which comprises causing the vapors of the compounds admixed with an oxidizing gas to react in the presence of a contact mass containing a multi-component zeolite which is the reaction product of at least one soluble silicate, at least one metallate, and at least one salt, the basic radical of which is a metal capable of entering into the non-exchangeable nucleus of a zeolite, at least one catalytically active component of the contact mass being chemically combined in or with the multi-component zeolite in non-exchangeable form.

6. A method of oxidizing the side chains of side chain aromatic compounds, which comprises causing the vapors of the compounds admixed with an oxidizing gas to react in the presence of a contact mass containing a diluted zeolite which is the reaction product of at least one soluble silicate, at least one metallate, and at least one salt, the basic radical of which is a metal capable of entering into the non-exchangeable nucleus of a zeolite, at least one catalytically effective component of the contact mass being physically associated with the multi-component zeolite in the form of a diluent.

7. A method of oxidizing the side chains of side chain aromatic compounds, which comprises causing the vapors of the compounds admixed with an oxidizing gas to react in the presence of a contact mass containing a zeolite which is the reaction product of at least one soluble silicate, at least one metallate, and at least one salt, the basic radical of which is a metal capable of entering into the non-exchangeable nucleus of a zeolite, the contact mass containing an oxy-compound of vanadium as at least one of its catalytically active components.

8. A method of oxidizing the side chains of side chain aromatic compounds, which comprises causing the vapors of the compounds admixed with an oxidizing gas to react in the presence of a contact mass containing a zeolite which is the reaction product of at least one soluble silicate, at least one metallate, and at least one salt, the basic radical of which is a metal capable of entering into the non-exchangeable nucleus of a zeolite in which chemically combined vanadium is present.

9. A method of oxidizing the side chains of benzene homologue compounds, which comprises subjecting them to reaction with an oxidizing gas in the presence of a contact mass containing a zeolite which is the reaction product of at least one soluble silicate, at least one metallate, and at least one salt, the basic radical of which is a metal capable of entering into the non-exchangeable nucleus of a zeolite.

10. A method of oxidizing the side chains of benzene homologue compounds, which comprises causing the vapors of the compounds to react with an oxidizing gas in the presence of a contact mass containing a zeolite which is the reaction product of at least one soluble silicate, at least one metallate, and at least one salt, the basic radical of which is a metal capable of entering into the non-exchangeable nucleus of a zeolite.

11. A method of oxidizing the methyl group of benzene homologue compounds containing at least one methyl group, which comprises causing the compounds to react with an oxidizing gas in the presence of a catalyst containing a zeolite which is the reaction product of at least one soluble silicate, at least one metallate, and at least one salt, the basic radical of which is a metal capable of entering into the non-exchangeable nucleus of a zeolite.

12. A method of oxidizing the methyl groups of benzene homologue compounds containing at least one methyl group, which comprises causing the vapors of the compounds to react with an oxidizing gas in the presence of a contact mass containing a zeolite which is the reaction product of at least one soluble silicate, at least one metallate, and at least one salt, the basic radical of which is a metal capable of entering into the non-exchangeable nucleus of a zeolite.

13. A method of oxidizing the side chain of toluene compounds which comprises causing the compounds to react with an oxidizing gas in the presence of a catalyst containing a zeolite which is the reaction product of at least one soluble silicate, at least one metallate, and at least one salt, the basic radical of which is a metal capable of entering into the non-exchangeable nucleus of a zeolite.

14. A method of oxidizing the side chain of toluene compounds, which comprises causing the vapors of the toluene compounds admixed with an oxidizing gas to react in the presence of a contact mass containing a zeolite which is the reaction product of at least one soluble silicate, at least one metallate, and at least one salt, the basic radical of which is a metal capable of entering into the non-exchangeable nucleus of a zeolite.

15. A method of oxidizing the side chain of toluene, which comprises causing toluene to react with an oxidizing gas in the presence of a catalyst containing a zeolite which is the reaction product of at least one soluble silicate, at least one metallate, and at least one salt, the basic radical of which is a metal capable of entering into the non-exchangeable nucleus of a zeolite.

Signed at Pittsburgh, Pennsylvania, this 23rd day of March, 1928.

ALPHONS O. JAEGER.